US012620315B2

(12) United States Patent
Suzuki

(10) Patent No.: US 12,620,315 B2
(45) Date of Patent: May 5, 2026

(54) VEHICLE DISPATCH MANAGEMENT CONTROL DEVICE, VEHICLE DISPATCH MANAGEMENT DEVICE, VEHICLE DISPATCH MANAGEMENT SYSTEM, VEHICLE DISPATCH MANAGEMENT METHOD, AND COMPUTER PROGRAM PRODUCT

(71) Applicant: JVCKENWOOD Corporation, Yokohama (JP)

(72) Inventor: Takumi Suzuki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 747 days.

(21) Appl. No.: 17/714,189

(22) Filed: Apr. 6, 2022

(65) Prior Publication Data

US 2022/0230546 A1 Jul. 21, 2022

Related U.S. Application Data

(63) Continuation of application No. PCT/JP2020/047560, filed on Dec. 18, 2020.

(30) Foreign Application Priority Data

Dec. 20, 2019 (JP) ................................. 2019-229944

(51) Int. Cl.
 *G08G 1/00* (2006.01)
 *G06Q 50/40* (2024.01)
 (Continued)
(52) U.S. Cl.
 CPC ............. *G08G 1/202* (2013.01); *G06Q 50/40* (2024.01); *G06T 7/70* (2017.01); *G06V 20/52* (2022.01);
 (Continued)

(58) Field of Classification Search
 CPC .. G08G 1/202; G06Q 50/40; G06Q 10/06311; G06T 7/70; G06T 2207/30196;
 (Continued)

(56) References Cited

U.S. PATENT DOCUMENTS

2018/0046961 A1* 2/2018 Theja .................... G06F 18/295

FOREIGN PATENT DOCUMENTS

JP 2002-190096 7/2002
JP 2002-340571 11/2002
 (Continued)

OTHER PUBLICATIONS

Machine Translation JP2005190001 (year: 2005).*
 (Continued)

*Primary Examiner* — Rachid Bendidi
*Assistant Examiner* — Kirsten Jade M Santos
(74) *Attorney, Agent, or Firm* — Amin, Turocy & Watson, LLP

(57) ABSTRACT

A vehicle dispatch management control device includes a vehicle information obtaining unit that obtains vehicle information containing the location information of a plurality of vehicles; an order information obtaining unit that obtains order information containing the location information of a client terminal which issued a vehicle dispatch order; a candidate vehicle searching unit that, based on the vehicle information, searches the vehicles for a candidate vehicle which matches with the conditions specified in the order information; a waiting place information obtaining unit that obtains waiting place information containing the location information of a plurality of waiting places at which vehicles remain on standby; and a dispatch-vehicle waiting-place information notifying unit that notifies the client terminal about dispatch schedule information.

14 Claims, 6 Drawing Sheets

(51) Int. Cl.
    *G06T 7/70*           (2017.01)
    *G06V 20/52*       (2022.01)
    *G06V 40/10*       (2022.01)
    *H04W 4/40*        (2018.01)

(52) U.S. Cl.
    CPC ............ *G06V 40/103* (2022.01); *H04W 4/40*
        (2018.02); *G06T 2207/30196* (2013.01); *G06T*
        *2207/30232* (2013.01); *G06T 2207/30242*
                                    (2013.01)

(58) Field of Classification Search
    CPC   G06T 2207/30232; G06T 2207/30242; G06V
           20/52; G06V 40/103; G06V 20/53; G06V
           20/54; H04W 4/40; H04W 4/025; H04W
                                   4/029
    See application file for complete search history.

(56) References Cited

FOREIGN PATENT DOCUMENTS

| | | | | |
|---|---|---|---|---|
| JP | 2005-190001 | | 7/2005 | |
| JP | 2017122980 A | * | 7/2017 | ............. G06Q 50/30 |
| JP | 2019175389 A | * | 10/2019 | ............. G06Q 50/10 |
| WO | WO2019225046 A1 | * | 11/2019 | ............. B60L 50/40 |

OTHER PUBLICATIONS

International Search Report and Written Opinion for International Application No. PCT/JP2020/047560 mailed on Feb. 9, 2021, 9 pages.

* cited by examiner

| NAME OF WAITING PLACE | TOKYO STATION WAITING PLACE |
|---|---|
| LOCATION OF WAITING PLACE | 39.123,136.54334 |
| CAPACITY OF VEHICLES ON STANDBY | 12 |
| SNEAK OUT FLAG | TRUE |

VEHICLE DISPATCH MANAGEMENT CONTROL DEVICE, VEHICLE DISPATCH MANAGEMENT DEVICE, VEHICLE DISPATCH MANAGEMENT SYSTEM, VEHICLE DISPATCH MANAGEMENT METHOD, AND COMPUTER PROGRAM PRODUCT

CROSS-REFERENCE TO RELATED APPLICATIONS

This application is a Continuation of PCT International Application No. PCT/JP2020/047560 filed on Dec. 18, 2020 which claims the benefit of priority from Japanese Patent Application No. 2019-229944 filed on Dec. 20, 2019, the entire contents of both of which are incorporated herein by reference.

BACKGROUND

1. Technical Field

The present disclosure is related to a vehicle dispatch management control device, a vehicle dispatch management device, a vehicle dispatch management system, a vehicle dispatch management method, and a computer program product.

2. Description of the Related Art

A vehicle dispatch management system is known in which the location information and the state information of service vehicles such as taxis, which have the global positioning system (GPS) and a communication device installed therein, is obtained and monitored; and a vehicle running nearby a customer is dispatched to the location at which the customer is waiting (for example, refer to Japanese Patent Application Laid-open No. 2002-190096).

When a customer uses a vehicle dispatch application and requests for the dispatch of a vehicle to the present location, the vehicle dispatch management system searches for the vehicles in the neighborhood of the present location of the customer and sends a vehicle for the pickup. However, there are some customers who walk to a waiting place such as a dispatch center or a taxi stand, and thus save on the pickup charge.

SUMMARY

It is an object of the present disclosure to at least partially solve the problems in the conventional technology.

To achieve the above object, a vehicle dispatch management control device according to an embodiment of the present disclosure includes a vehicle information obtaining unit that obtains vehicle information containing location information of a plurality of vehicles, an order information obtaining unit that obtains order information containing location information of a client terminal which issued a vehicle dispatch order, a candidate vehicle searching unit that, based on the vehicle information, searches the plurality of vehicles for a candidate vehicle which matches with condition specified in the order information, a waiting place information obtaining unit that obtains waiting place information containing location information of a plurality of waiting places at which vehicles remain on standby, and a dispatch-vehicle waiting-place information notifying unit that notifies the client terminal about dispatch schedule information containing required time from the candidate vehicle to the client terminal, and nearby waiting place information containing location information of the waiting places. The dispatch-vehicle waiting-place information notifying unit notifies the client terminal about required time from the client terminal to the waiting places or distance from the client terminal to the waiting places.

To achieve the above object, a vehicle dispatch management method according to an embodiment of the present disclosure includes obtaining vehicle information containing location information of a plurality of vehicles, obtaining order information containing location information of a client terminal which issued a vehicle dispatch order, searching that, based on the vehicle information, includes searching the plurality of vehicles for a candidate vehicle which matches with condition specified in the order information, obtaining waiting place information containing location information of a plurality of waiting places at which vehicles remain on standby, and notifying the client terminal about required time from the candidate vehicle to the client terminal, and location information of the waiting places. The notifying notifies the client terminal about required time from the client terminal to the waiting places or distance from the client terminal to the waiting places.

To achieve the above object, a non-transitory computer readable recording medium storing therein a computer program product having a computer readable medium including programmed instructions is disclosed. The instructions, when executed by a computer functioning as a vehicle dispatch management control device, cause the computer to perform obtaining vehicle information containing location information of a plurality of vehicles, obtaining order information containing location information of a client terminal which issued a vehicle dispatch order, searching that, based on the vehicle information, includes searching the plurality of vehicles for a candidate vehicle which matches with condition specified in the order information, obtaining waiting place information containing location information of a plurality of waiting places at which vehicles remain on standby, and notifying the client terminal about required time from the candidate vehicle to the client terminal, and location information of the waiting places. The notifying notifies the client terminal about required time from the client terminal to the waiting places or distance from the client terminal to the waiting places.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

An exemplary embodiment is described below in detail with reference to the accompanying drawings. However, the present disclosure is not limited by the embodiment described below. Moreover, when there is a plurality of embodiments, it is possible to have a configuration having a combination of the embodiments.

EMBODIMENT

Configuration of System

Figure 1:
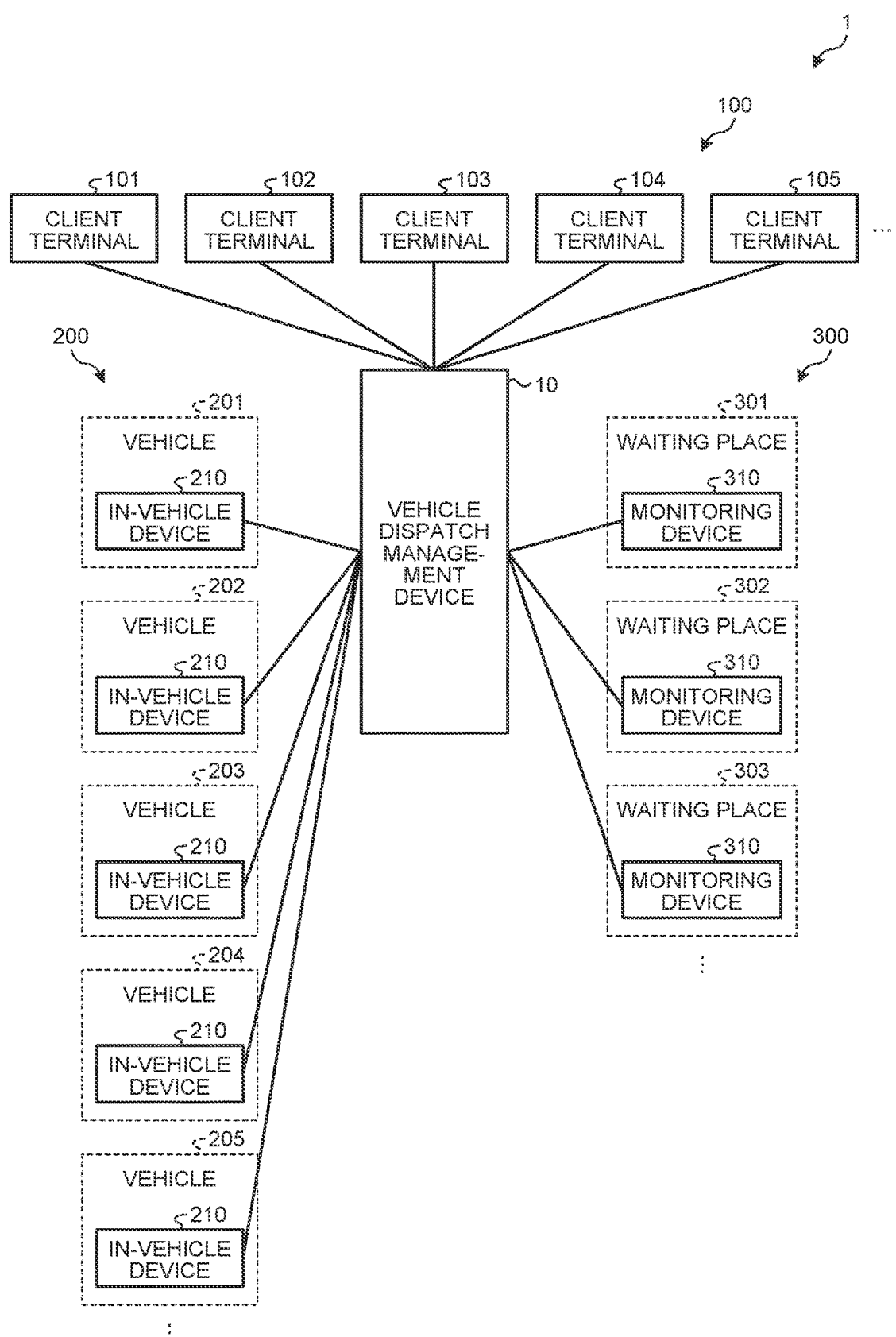
FIG. 1 is a block diagram illustrating an example of a vehicle dispatch management system according to an embodiment.

Explained below with reference to FIG. 1 is a vehicle dispatch management system 1 according to the embodiment. FIG. 1 is a block diagram illustrating an example of the vehicle dispatch management system according to the embodiment. The vehicle dispatch management system 1 is a system for dispatching vehicles based on the vehicle dispatch orders issued by the clients. The vehicle dispatch management system 1 includes a plurality of client terminals 100, a plurality of vehicles 200, a plurality of waiting places 300, and a vehicle dispatch management device 10.

In the embodiment, the client terminals 100 include client terminals 101, 102, 103, 104, and 105. Herein, the client terminals 101, 102, 103, 104, and 105 are, for example, smartphones in which a vehicle dispatch application is installed for use by the clients. The client terminals 101, 102, 103, 104, and 105 are capable of communicating with the vehicle dispatch management device 10 via a communication network such as the Internet or a cellular phone network. The communication network is compatible to, for example, the long term evolution (LTE). In the following explanation, when the client terminals 101, 102, 103, 104, and 105 need not be distinguished from each other, they are referred to as the client terminals 100. Each client terminal 100 is capable of monitoring the state of the vehicles 200 and the state of the waiting places 300 via the vehicle dispatch management device 10. Moreover, the client terminal 100 is capable of issuing a vehicle dispatch order to the vehicle dispatch management device 10. Furthermore, the client terminal 100 can receive information about the dispatched vehicle from the vehicle dispatch management device 10.

In the embodiment, the vehicles 200 include vehicles 201, 202, 203, 204, and 205. Herein, the vehicles 201, 202, 203, 204, and 205 are, for example, service vehicles such as taxis that cater to a large number of unspecified passengers. Each of the vehicles 201, 202, 203, 204, and 205 has an in-vehicle device 210 installed therein. In the following explanation, when the vehicles 201, 202, 203, 204, and 205 need not be distinguished from each other, they are referred to as the vehicles 200.

The in-vehicle device 210 is capable of communicating with the vehicle dispatch management device 10 via a communication network such as the Internet or a cellular phone network. The communication network is compatible to, for example, the LTE. The in-vehicle device 210 notifies the vehicle dispatch management device 10 about vehicle location information indicating the present location of the corresponding vehicle 200; vehicle mode information indicating the present mode of the corresponding vehicle 200; and present standby state information of the corresponding vehicle 200. The vehicle mode indicates the operation mode such as an empty mode, an occupied mode, a payment mode, a pickup mode, or an out-of-service mode. The standby state information indicates whether or not the concerned vehicle 200 is waiting at one of the waiting places 300 such as a dispatch center or a taxi stand, and indicates the waiting number of the concerned vehicle 200 at the waiting place 300. The in-vehicle device 210 can receive a vehicle dispatch instruction and order information from the vehicle dispatch management device 10. Moreover, the in-vehicle device 210 can send, to the vehicle dispatch management device 10, a response about whether or not a vehicle dispatch order can be accepted.

In the embodiment, the waiting places 300 include waiting places 301, 302, and 303. Herein, the waiting places 301, 302, and 303 are places such as dispatch centers or taxi stands at which the vehicles 200 wait for customers or for vehicle dispatch orders. Each of the waiting places 301, 302, and 303 has a monitoring device 310 installed thereat. In the following explanation, when the waiting places 301, 302, and 303 need not be distinguished from each other, they are referred to as the waiting places 300.

The monitoring device 310 is capable of communicating with the vehicle dispatch management device 10 via a communication network such as the Internet or a cellular phone network. The communication network is compatible to, for example, the LTE. The monitoring device 310 notifies the vehicle dispatch management device 10 about waiting person count information indicating the number of persons waiting at the corresponding waiting place 300. Moreover, the monitoring device 310 can also send, to the vehicle dispatch management device 10, imaging data of the corresponding waiting place 300 so as to enable detection of the number of persons waiting at the corresponding waiting place 300.

The vehicle dispatch management device 10 is a server computer capable of communicating with the client terminals 100, the in-vehicle devices 210 of the vehicles 200, and the waiting places 300 via a communication network such as the Internet or a cellular phone network. The communication network is compatible to, for example, the LTE. The vehicle dispatch management device 10 is capable of monitoring the state of the vehicles 200 that includes the vehicle location information indicating the present locations of the vehicles 200; the vehicle mode information indicating the present mode of the vehicles 200; and the present standby state information of the vehicles 200. Moreover, the vehicle dispatch management device 10 is capable of monitoring the waiting person count information at the waiting places 300. Based on a vehicle dispatch order issued by any of the client terminals 100, the vehicle dispatch management device 10 selects the vehicle 200 to be dispatched. Then, the vehicle dispatch management device 10 issues a vehicle dispatch instruction to the vehicle 200 decided to be the dispatch vehicle. Moreover, the vehicle dispatch management device 10 sends the information about the dispatch vehicle to the concerned client terminal 100.

Configuration of Vehicle Dispatch Management Device

Figure 2:
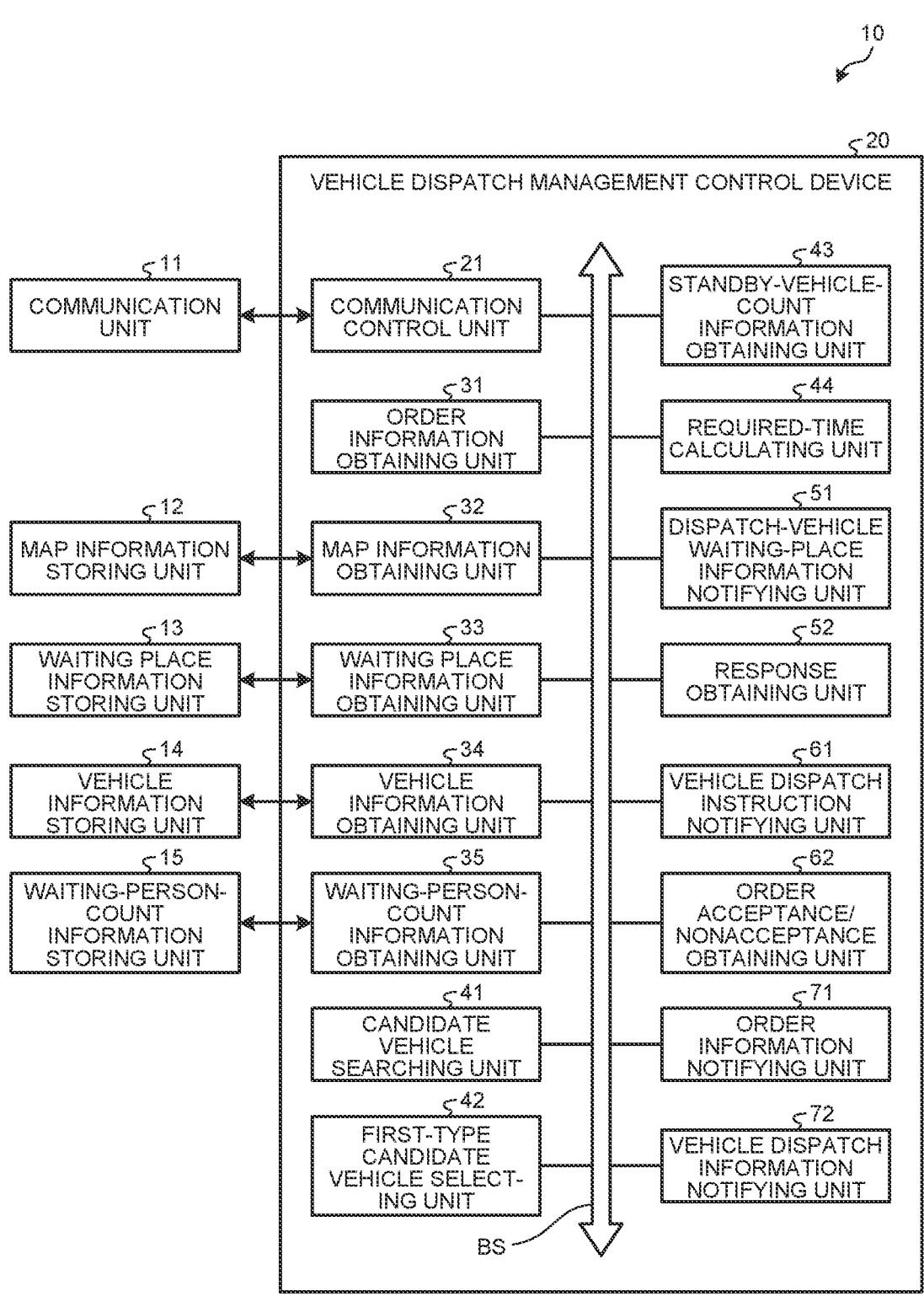
FIG. 2 is a block diagram illustrating an exemplary configuration of a vehicle dispatch management device according to the embodiment.

Explained below with reference to FIG. 2 is a detailed configuration of the vehicle dispatch management device 10. FIG. 2 is a block diagram illustrating an exemplary configuration of the vehicle dispatch management device according to the embodiment. The vehicle dispatch management device 10 includes a communication unit 11, a map information storing unit 12, a waiting place information storing unit 13, a vehicle information storing unit 14, a waiting-person-count information storing unit 15, and a vehicle dispatch management control device 20.

The communication unit 11 is a unit for performing communication. The communication unit 11 performs communication with the client terminals 100 and the vehicles 200. For example, the communication unit 11 receives order information of a vehicle dispatch order from any one of the client terminals 100. The order information at least contains the location information of the vehicle dispatch location. In the embodiment, the vehicle dispatch location represents the present location of the client terminal 100. Moreover, for example, the order information can contain additional conditions set by the concerned client terminal 100. Examples of the additional conditions include the maximum waiting period, the maximum pickup distance, the vehicle height, the vehicle color, the passenger capacity, and the permission/no permission for pets. In response, for example, the communication unit 11 sends, to the client terminal 100, vehicle dispatch schedule information, nearby-waiting-place information, vehicle count information at the waiting place 300, and the waiting person count information at the waiting place 300. Then, for example, the communication unit 11 receives a vehicle dispatch request from the client terminal 100. Accordingly, for example, the communication unit 11 sends, to the concerned vehicle 200, a vehicle dispatch instruction for requesting to accept the vehicle dispatch order. In response, for example, the communication unit 11 receives, from the vehicle 200, response information indicating whether or not the vehicle dispatch order can be accepted. Then, for example, the communication unit 11 sends detailed information of the order information to the vehicle 200. Furthermore, for example, the communication unit 11 sends, to the client terminal 100, either the information about the vehicle 200 to be dispatched, or the vehicle dispatch information containing order nonacceptance information indicating that a vehicle cannot be dispatched under the set conditions. The information about the vehicle 200 to be dispatched contains, for example, the name of the driver, the registration number of the vehicle, and the estimated time of arrival at the vehicle dispatch location. The communication unit 11 performs such a variety of communication based on the control signals output from a communication control unit 21 of the vehicle dispatch management control device 20.

The map information storing unit 12 is used to store map information. The map information represents, for example, a road map including the intersections. The map information storing unit 12 outputs the stored map information to a map information obtaining unit 32 of the vehicle dispatch management control device 20. Meanwhile, the map information storing unit 12 can be a memory device of some other external server other than the vehicle dispatch management device 10. When the map information storing unit 12 is a memory device of some other external server, it can output the map information to the map information obtaining unit 32 using the communication function provided by the communication control unit 21 and the communication unit 11.

Figures 3, 4:
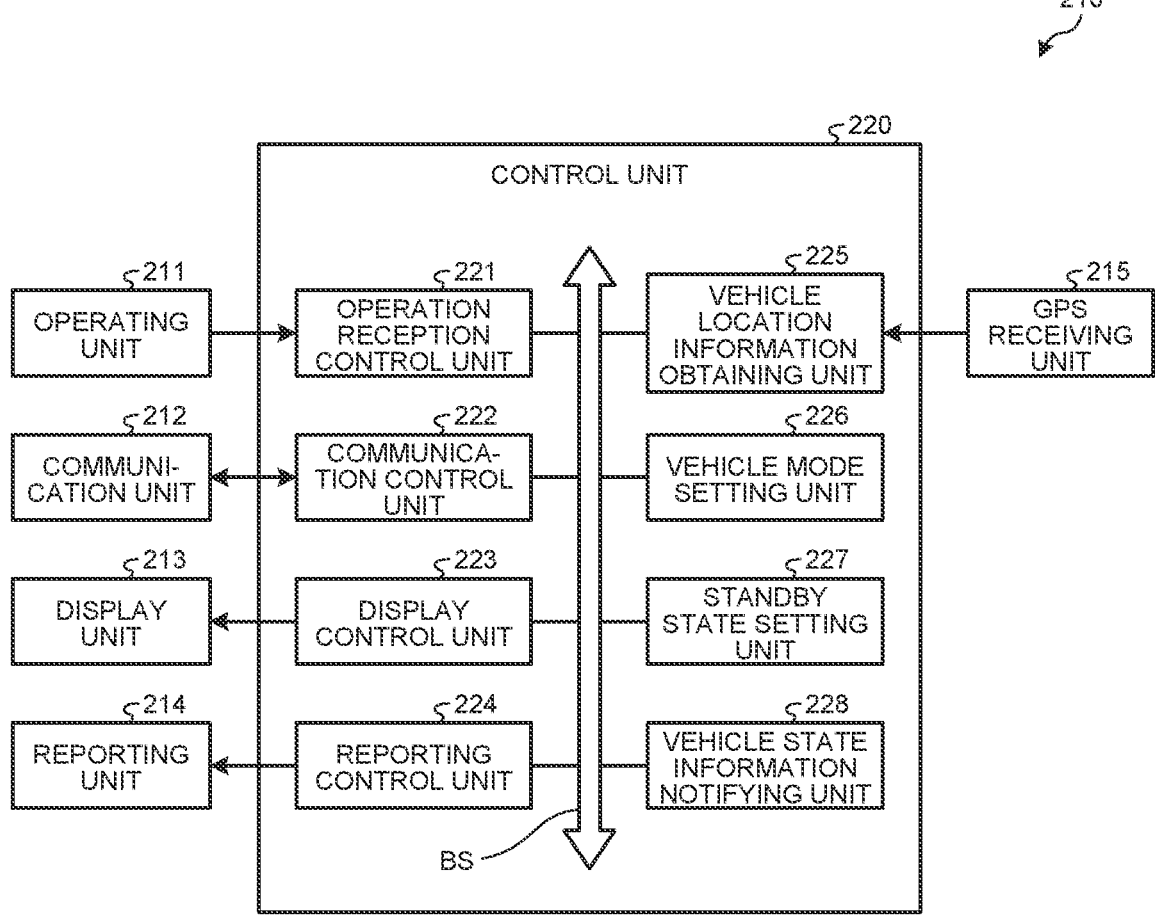
FIG. 3 is a diagram illustrating an example of waiting place information according to the embodiment.
FIG. 4 is a block diagram illustrating an exemplary configuration of an in-vehicle device according to the embodiment.

The waiting place information storing unit 13 is used to store the waiting place information. As illustrated in FIG. 3, the waiting place information contains the location information of the waiting place 300 such as a dispatch center or a taxi stand at which the vehicles 200 are on standby. The location information of the waiting place 300 contains, for example, longitude information and latitude information. Moreover, the waiting place information can also contain, for example, information such as the name of the waiting place, the possible number of vehicles on standby, and a sneak out flag. The sneak out flag indicates whether or not, from among the vehicles 200 queued up at the waiting place 300, any vehicle 200 other than the leading vehicle 200 can sneak out sooner.

The vehicle information storing unit 14 is used to store vehicle information sent from the vehicles 200. The vehicle information at least contains standby state information, which indicates the standby state of a plurality of vehicles 200 at the respective waiting places 300, and location information. Moreover, for example, the vehicle information can contain the vehicle state information of a plurality of vehicles 200. The vehicle state information contains information about the operation mode of each vehicle 200 such as the empty mode, the occupied mode, the payment mode, the pickup mode, or the out-of-service mode. The vehicle information storing unit 14 outputs the stored vehicle information to a vehicle information obtaining unit 34 of the vehicle dispatch management control device 20. Meanwhile, the vehicle information storing unit 14 can be an internal memory included in the vehicle dispatch management control device 20. Alternatively, the vehicle information storing unit 14 can be a memory device of some other external server other than the vehicle dispatch management device 10. When the vehicle information storing unit 14 is a memory device of some other external server, it outputs the vehicle information to the vehicle information obtaining unit 34 using the communication function provided by the communication control unit 21 and the communication unit 11.

The waiting-person-count information storing unit 15 is used to store the waiting person count information indicating the number of persons waiting at each waiting place 300. The waiting person count is measured based on the image data taken by an imaging unit 311 of the monitoring device 310 installed at the waiting place 300.

The vehicle dispatch management control device 20 is, for example, an arithmetic processing device (a control device) configured with a central processing unit (CPU). The vehicle dispatch management control device 20 loads stored computer programs into a memory and executes the instructions written in the computer programs. The vehicle dispatch management control device 20 includes an internal memory (not illustrated). The internal memory is used to store computer programs written for implementing the constituent elements of the vehicle dispatch management control device 20. In that case, the vehicle dispatch management control device 20 loads the computer programs stored in the internal memory, and executes them so that the functions of the constituent elements are implemented. Meanwhile, the internal memory is also used to temporarily store the data of the vehicle dispatch management control device 20. The vehicle dispatch management control device 20 includes the following constituent elements connected to each other by a bus BS: the communication control unit 21, an order information obtaining unit 31, the map information obtaining unit 32, a waiting place information obtaining unit 33, the vehicle information obtaining unit 34, a waiting-person-count information obtaining unit 35, a candidate vehicle searching unit 41, a first-type candidate vehicle selecting unit 42, a standby-vehicle-count information obtaining unit 43, a required-time calculating unit 44, a dispatch-vehicle waiting-place information notifying unit 51, a response obtaining unit 52, a vehicle dispatch instruction notifying unit 61, an order acceptance/nonacceptance obtaining unit 62, an order information notifying unit 71, and a vehicle dispatch information notifying unit 72.

The communication control unit 21 controls the communication performed by the communication unit 11. For example, the communication control unit 21 obtains the communication information obtained from the dispatch-vehicle waiting-place information notifying unit 51, the vehicle dispatch instruction notifying unit 61, the order information notifying unit 71, or the vehicle dispatch information notifying unit 72. Then, the communication control unit 21 outputs the obtained communication information to the communication unit 11. Moreover, for example, the communication control unit 21 outputs a variety of information, which is received by the communication unit 11, to the order information obtaining unit 31, the vehicle information obtaining unit 34, the waiting-person-count information obtaining unit 35, the response obtaining unit 52, or the order acceptance/nonacceptance obtaining unit 62. For example, the communication control unit 21 outputs, to the order information obtaining unit 31, the order information about a vehicle dispatch order received by the communication unit 11 from the client terminal 100. Moreover, for example, the communication control unit 21 outputs, to the vehicle information obtaining unit 34, the vehicle information received by the communication unit 11 from the vehicle 200. Furthermore, for example, the communication control unit 21 obtains, from the dispatch-vehicle waiting-place information notifying unit 51, communication information to be used for notifying the client terminal 100 about the vehicle dispatch schedule information, the nearby-waiting-place information, the vehicle count information at the waiting place 300, and the waiting person count information at the waiting place 300. Moreover, for example, the communication control unit 21 obtains, from the response obtaining unit 52, response information that indicates whether or not to issue a vehicle dispatch request and that is received by the communication unit 11 from the client terminal 100. Furthermore, for example, the communication control unit 21 obtains, from the vehicle dispatch instruction notifying unit 61, communication information to be used for notifying the vehicle 200 about a vehicle dispatch instruction for requesting to accept the vehicle dispatch order. Moreover, for example, the communication control unit 21 outputs, to the order acceptance/nonacceptance obtaining unit 62, response information received by the communication unit 11 from the vehicle 200 about whether or not the vehicle dispatch order can be accepted. Furthermore, for example, the communication control unit 21 obtains, from the order information notifying unit 71, the order information to be used for notifying the vehicle 200 about the details of the order information. Moreover, for example, the communication control unit 21 obtains, from the vehicle dispatch information notifying unit 72, communication information to be used for notifying the client terminal 100 either about the information about the vehicle 200 to be dispatched, or about the vehicle dispatch information containing request nonacceptance information indicating that a vehicle cannot be dispatched under the set conditions.

The order information obtaining unit 31 obtains the order information about the vehicle dispatch order as received by the communication unit 11 from the client terminal 100.

Then, the order information obtaining unit 31 outputs the obtained order information to the map information obtaining unit 32, the waiting place information obtaining unit 33, the candidate vehicle searching unit 41, the first-type candidate vehicle selecting unit 42, the required-time calculating unit 44, the vehicle dispatch instruction notifying unit 61, and the order information notifying unit 71.

The map information obtaining unit 32 obtains the map information from the map information storing unit 12. More specifically, based on the location information of the vehicle dispatch location as obtained by the order information obtaining unit 31, the map information obtaining unit 32 obtains the map information of the vehicle dispatch location periphery from the map information storing unit 12. The vehicle dispatch location periphery represents a predetermined range centered on the vehicle dispatch location. The predetermined range is, for example, based on the direct distance from the candidate vehicle to the vehicle dispatch location, or based on the route from the candidate vehicle to the vehicle dispatch location, or based on the required time from the candidate vehicle to the vehicle dispatch location. Then, the map information obtaining unit 32 outputs the obtained map information to the waiting place information obtaining unit 33, the vehicle information obtaining unit 34, the candidate vehicle searching unit 41, and the required-time calculating unit 44.

The waiting place information obtaining unit 33 obtains, from the waiting place information storing unit 13, waiting place information containing the location information of the waiting place 300. More specifically, based on the location information of the vehicle dispatch location as obtained by the order information obtaining unit 31, the waiting place information obtaining unit 33 obtains, from the waiting place information storing unit 13, the waiting place information of the waiting place 300 in the vehicle dispatch location periphery. Then, the waiting place information obtaining unit 33 outputs the obtained waiting place information to the waiting-person-count information obtaining unit 35, the standby-vehicle-count information obtaining unit 43, and the required-time calculating unit 44.

The vehicle information obtaining unit 34 obtains the vehicle information from the vehicle information storing unit 14. The vehicle information at least contains the standby state information, which indicates the standby state of the vehicles 200 at the waiting place 300 in the vehicle dispatch location periphery, and the location information. The vehicle information obtaining unit 34 can directly obtain, from the communication control unit 21, the vehicle information received by the communication unit 11 from the vehicles 200. Then, the vehicle information obtaining unit 34 outputs the obtained vehicle information to the candidate vehicle searching unit 41, the first-type candidate vehicle selecting unit 42, the standby-vehicle-count information obtaining unit 43, and the required-time calculating unit 44.

The waiting-person-count information obtaining unit 35 obtains, from the waiting-person-count information storing unit 15, the waiting person count information indicating the number of persons queued up at the waiting place 300. The waiting person count information at least contains the waiting person count information at the waiting place 300 in the vehicle dispatch location periphery. Then, the waiting-person-count information obtaining unit 35 outputs the obtained waiting person count information to the dispatch-vehicle waiting-place information notifying unit 51.

The candidate vehicle searching unit 41 searches a plurality of vehicles 200 for candidate vehicles that match with the conditions specified in the order information. More specifically, the candidate vehicle searching unit 41 searches for the candidate vehicles based on the order information obtained by the order information obtaining unit 31, based on the map information obtained by the map information obtaining unit 32, and based on the vehicle information of a plurality of vehicles 200 as obtained by the vehicle information obtaining unit 34. The conditions specified in the order information at least include the condition of being present in a predetermined range centered on the vehicle dispatch location. Moreover, the conditions specified in the order information can include additional conditions set by the client terminal 100. The candidate vehicle searching unit 41 outputs the information of the retrieved candidate vehicles to the first-type candidate vehicle selecting unit 42, the standby-vehicle-count information obtaining unit 43, the required-time calculating unit 44, and the vehicle dispatch information notifying unit 72.

The first-type candidate vehicle selecting unit 42 selects, according to predetermined conditions, a single first-type candidate vehicle from among a plurality of candidate vehicles. More specifically, based on the location information of the vehicle dispatch location as obtained by the order information obtaining unit 31 and based on the vehicle information obtained by the vehicle information obtaining unit 34, the first-type candidate vehicle selecting unit 42 selects a single first-type candidate vehicle from among a plurality of candidate vehicles retrieved by the candidate vehicle searching unit 41. The first-type candidate vehicle is selected based on the direct distance from the candidate vehicle to the vehicle dispatch location, or based on the route from the candidate vehicle to the vehicle dispatch location, or based on the required time from the candidate vehicle to the vehicle dispatch location. For example, the first-type candidate vehicle is the closest vehicle to the vehicle dispatch location. Then, the first-type candidate vehicle selecting unit 42 outputs the information about the selected first-type candidate vehicle to the required-time calculating unit 44, the vehicle dispatch instruction notifying unit 61, the order information notifying unit 71, and the vehicle dispatch information notifying unit 72.

The standby-vehicle-count information obtaining unit 43 obtains standby vehicle count information indicating the number of candidate vehicles on standby at the waiting place 300. More specifically, the standby-vehicle-count information obtaining unit 43 can obtain the standby vehicle count information based on the waiting place information obtained by the waiting place information obtaining unit 33 and based on the standby state information of the vehicles 200 as obtained by the vehicle information obtaining unit 34. Alternatively, the standby-vehicle-count information obtaining unit 43 can obtain the standby vehicle count information based on the standby state information of the candidate vehicles retrieved by the candidate vehicle searching unit 41. Then, the standby-vehicle-count information obtaining unit 43 outputs the standby vehicle count information to the dispatch-vehicle waiting-place information notifying unit 51.

The required-time calculating unit 44 calculates the required time from the candidate vehicles to the vehicle dispatch location. More specifically, based on the order information obtained by the order information obtaining unit 31, based on the map information obtained by the map information obtaining unit 32, and based on the vehicle information of a plurality of vehicles 200 as obtained by the vehicle information obtaining unit 34; the required-time calculating unit 44 calculates the required time from the candidate vehicles, which are retrieved by the candidate vehicle searching unit 41, to the concerned client terminal 100. Moreover, the required-time calculating unit 44 calculates the required time on foot from the client terminal 100 to the waiting place 300. More specifically, based on the order information obtained by the order information obtaining unit 31, based on the map information obtained by the map information obtaining unit 32, and based on the waiting place information obtained by the waiting place information obtaining unit 33; the required-time calculating unit 44 calculates the required time on foot from the client terminal 100 to the waiting place 300. Then, the required-time calculating unit 44 outputs each calculated required time to the dispatch-vehicle waiting-place information notifying unit 51.

The dispatch-vehicle waiting-place information notifying unit 51 notifies the client terminal 100 about the vehicle dispatch schedule information and the nearby-waiting-place information. The vehicle dispatch schedule information contains the waiting period till the dispatch of a vehicle. The nearby-waiting-place information contains the location information of the nearby waiting place 300. In the embodiment, the nearby-waiting-place information contains the required time to reach the waiting place 300. More specifically, the dispatch-vehicle waiting-place information notifying unit 51 outputs, to the communication control unit 21, communication information to be used for notifying the vehicle dispatch schedule information and the nearby-waiting-place information. The waiting period till the dispatch of a vehicle represents the required time for the candidate vehicles to reach the client terminal 100 as calculated by the required-time calculating unit 44. The required time to reach the nearby waiting place 300 represents the required time on foot from the client terminal 100 to the waiting place 300 as calculated by the required-time calculating unit 44. Meanwhile, the dispatch-vehicle waiting-place information notifying unit 51 can notify the client terminal 100 also about the standby vehicle count information indicating the number of candidate vehicles on standby at the waiting place 300. More specifically, the dispatch-vehicle waiting-place information notifying unit 51 can output, to the communication control unit 21, communication information to be used for notifying the standby vehicle count information indicating the number of candidate vehicles on standby at the waiting place 300 as obtained from the standby-vehicle-count information obtaining unit 43. Moreover, the dispatch-vehicle waiting-place information notifying unit 51 can notify the client terminal 100 about the waiting person count information indicating the number of persons queued up at the waiting place 300. More specifically, the dispatch-vehicle waiting-place information notifying unit 51 can output, to the communication control unit 21, communication information to be used for notifying the waiting person count information indicating the number of persons queued up at the waiting place 300 as obtained by the waiting-person-count information obtaining unit 35.

The response obtaining unit 52 obtains the response information that is about whether or not to issue a vehicle dispatch request and that is received by the communication unit 11 from the client terminal 100. Then, the response obtaining unit 52 outputs, to the vehicle dispatch instruction notifying unit 61, the obtained response information about whether or not to issue a vehicle dispatch request.

The vehicle dispatch instruction notifying unit 61 notifies the first-type candidate vehicle about a vehicle dispatch instruction for requesting to accept the vehicle dispatch order that is received by the order information obtaining unit 31. More specifically, when response information indicating that a vehicle dispatch request is to be issued is obtained by the response obtaining unit 52; the vehicle dispatch instruction notifying unit 61 outputs, to the communication control unit 21, communication information to be used for notifying the first-type candidate vehicle, which is selected by the first-type candidate vehicle selecting unit 42, about the vehicle dispatch instruction. The vehicle dispatch instruction at least includes the location information of the vehicle dispatch location.

The order acceptance/nonacceptance obtaining unit 62 obtains the response information that indicates the acceptance/nonacceptance of the vehicle dispatch order and that is received by the communication unit 11 from the first-type candidate vehicle. Then, the order acceptance/nonacceptance obtaining unit 62 outputs, to the order information notifying unit 71 and the vehicle dispatch information notifying unit 72, the obtained response information indicating the acceptance/nonacceptance of the vehicle dispatch order.

The order information notifying unit 71 notifies the dispatch vehicle about the details of the order information. More specifically, when the response indicating acceptance of the vehicle dispatch order is received by the order acceptance/nonacceptance obtaining unit 62 from the first-type candidate vehicle, the order information notifying unit 71 sets the first-type candidate vehicle as the dispatch vehicle and outputs, to the communication control unit 21, communication information to be used for notifying the dispatch vehicle about the details of the order information. The details of the order information can include, for example, the name of the person who issued the vehicle dispatch order.

The vehicle dispatch information notifying unit 72 notifies the client terminal 100 about the vehicle dispatch information. More specifically, when the response indicating acceptance of the vehicle dispatch order is received by the order acceptance/nonacceptance obtaining unit 62 from the first-type candidate vehicle, the vehicle dispatch information notifying unit 72 sets the first-type candidate vehicle as the dispatch vehicle and outputs, to the communication control unit 21, communication information to be used for notifying the client terminal 100 about the vehicle dispatch information representing the information about the vehicle 200 to be dispatched. On the other hand, when the candidate vehicle searching unit 41 could not find the candidate vehicles or when the response indicating acceptance of the vehicle dispatch order is not received by the order acceptance/nonacceptance obtaining unit 62 from the first-type candidate vehicle; the vehicle dispatch information notifying unit 72 outputs, to the communication control unit 21, communication information to be used for notifying the client terminal 100 about order nonacceptance information indicating that a vehicle cannot be dispatched under the set conditions.

Configuration of In-Vehicle Device

Explained below with reference to FIG. 4 is a detailed configuration of the in-vehicle device 210. FIG. 4 is a block diagram illustrating an exemplary configuration of the in-vehicle device according to the embodiment. The in-vehicle device 210 includes an operating unit 211, a communication unit 212, a display unit 213, a reporting unit 214, a GPS receiving unit 215, and a control unit 220.

The operating unit 211 can receive various operations with respect to the control unit 220. For example, the operating unit 211 can receive an operation for setting the vehicle mode of the corresponding vehicle 200. Moreover, for example, the operating unit 211 can receive an operation for setting the standby state of the corresponding vehicle 200. Furthermore, for example, the operating unit 211 can receive an operation for selecting whether or not a vehicle dispatch order can be accepted. Then, the operating unit 211 outputs, to an operation reception control unit 221 of the control unit 220, an operation signal corresponding to the received operation. The operating unit 211 can be implemented using, for example, physical switches or a touch-sensitive panel installed in the display unit 213.

The communication unit 212 is a unit for performing communication. The communication unit 212 performs communication with the vehicle dispatch management device 10. For example, the communication unit 212 receives a vehicle dispatch instruction indicating a request for accepting a vehicle dispatch order, or receives the detailed information of the order information from the vehicle dispatch management device 10. Moreover, for example, the communication unit 212 sends the following information to the vehicle dispatch management device 10: the vehicle location information of the corresponding vehicle 200, the vehicle mode information of the corresponding vehicle 200, the standby state information of the corresponding vehicle 200, and the response information indicating whether or not a vehicle dispatch order can be accepted. The communication unit 212 performs a variety of communication based on the control signals output from a communication control unit 222 of the control unit 220.

The display unit 213 displays various images. For example, the display unit 213 displays notification information of a vehicle dispatch instruction as received by the communication unit 212 from the vehicle dispatch management device 10, or displays the detailed information of the order information. Moreover, for example, the display unit 213 displays a selection screen that enables selection of whether or not to accept a vehicle dispatch order. Furthermore, for example, the display unit 213 displays the present vehicle mode information as set by a vehicle mode setting unit 226. Moreover, for example, the display unit 213 displays the present standby state information as set by a standby state setting unit 227. The display unit 213 is, for example, a display dedicated device of the in-vehicle device 210, or a display device shared with other systems such as a navigation system. Moreover, the display unit 213 is, for example, a liquid crystal display (LCD) or an organic electro-luminescence (organic EL) display. In the present embodiment, the display unit 213 is installed in the dashboard, or the instrument panel, or the center console present in front of the driver of the vehicle. The display unit 213 displays images based on image signals output from a display control unit 223 of the control unit 220.

The reporting unit 214 reports a variety of information. For example, the reporting unit 214 is configured using, for example, the display installed in the display unit 213 or a speaker used for notifying predetermined report information in the audio form. For example, the reporting unit 214 reports the notification information of a vehicle dispatch instruction or reports the detailed information of the order information. Moreover, for example, the reporting unit 214 reports report information that prompts the driver to select between accepting or rejecting the vehicle dispatch order. Moreover, for example, the reporting unit 214 reports vehicle mode setting information indicating that the vehicle mode has been set by the vehicle mode setting unit 226. Furthermore, for example, the reporting unit 214 reports standby state setting information indicating that the standby state has been set by the standby state setting unit 227. The reporting unit 214 reports the report information based on the image signals and the audio signals output from a reporting control unit 224 of the control unit 220.

The GPS receiving unit 215 receives radio waves from a GPS satellite (not illustrated). The GPS receiving unit 215 is configured with a GPS receiving circuit and a GPS receiving antenna. The GPS receiving unit 215 outputs the signals of the received radio waves to a vehicle location information obtaining unit 225 of the control unit 220.

The control unit 220 is, for example, an arithmetic processing device (a control device) configured with a CPU. The control unit 220 loads stored computer programs into a memory and executes the instructions written in the computer programs. The control unit 220 includes an internal memory (not illustrated). The internal memory is used to store computer programs written for implementing the constituent elements of the control unit 220. In that case, the control unit 220 loads the computer programs stored in the internal memory, and executes them so that the functions of the constituent elements are implemented. Meanwhile, the internal memory is also used to temporarily store the data of the control unit 220. The control unit 220 includes the following constituent elements connected to each other by the bus BS: the operation reception control unit 221, the communication control unit 222, the display control unit 223, the reporting control unit 224, the vehicle location information obtaining unit 225, the vehicle mode setting unit 226, the standby state setting unit 227, and a vehicle state information notifying unit 228.

The operation reception control unit 221 obtains operation information of the operation received by the operating unit 211. For example, the operation reception control unit 221 obtains the vehicle mode setting information indicating the operation of setting the vehicle mode of the corresponding vehicle 200, and outputs a control signal. Moreover, for example, the operation reception control unit 221 obtains the standby state setting information indicating the operation of setting the standby state of the corresponding vehicle 200, and outputs a control signal. Furthermore, for example, the operation reception control unit 221 obtains the order acceptance/nonacceptance response operation information indicating the operation of responding with acceptance or nonacceptance of the vehicle dispatch order, and outputs a control signal. Then, the operation reception control unit 221 outputs the obtained control signals to the vehicle mode setting unit 226, the standby state setting unit 227, and the communication control unit 222, respectively.

The communication control unit 222 controls the communication performed by the communication unit 212. For example, the communication control unit 222 obtains the communication information that is output from the operation reception control unit 221, the vehicle location information obtaining unit 225, or the vehicle state information notifying unit 228. Then, the communication control unit 222 outputs the obtained communication information to the communication unit 212. For example, the communication control unit 222 outputs a variety of information, which is received by the communication unit 212, to the display control unit 223 or the reporting control unit 224. Moreover, for example, the communication control unit 222 obtains the vehicle location information of the corresponding vehicle 200 from the vehicle location information obtaining unit 225. Furthermore, for example, the communication control unit 222 obtains, from the vehicle state information notifying unit 228, communication information to be used for notifying the vehicle dispatch management device 10 about the vehicle state information containing the vehicle mode information and the standby state information of the corresponding vehicle 200. Moreover, for example, the communication control unit 222 obtains, from the operation reception control unit 221, the response information indicating acceptance or nonacceptance of a vehicle dispatch order. Furthermore, for example, the communication control unit 222 outputs, to the display control unit 223 or the reporting control unit 224, the vehicle dispatch instruction or the details of the order information.

The display control unit 223 performs control to ensure that the display in the display unit 213 is performed based on predetermined conditions and based on the obtained display information. For example, in the display unit 213, the display control unit 223 displays the notification information of the vehicle dispatch instruction received by the communication unit 212 from the vehicle dispatch management device 10, or displays the detailed information of the order information. Moreover, for example, the display control unit 223 displays, in the display unit 213, a selection screen that enables selection between accepting and rejecting the vehicle dispatch order. Furthermore, for example, the display control unit 223 displays, in the display unit 213, the present vehicle mode information set by the vehicle mode setting unit 226. Moreover, for example, the display control unit 223 displays, in the display unit 213, the present standby state information set by the standby state setting unit 227.

The reporting control unit 224 performs control to ensure that the reporting unit 214 performs reporting based on predetermined conditions and based on the obtained report information. For example, the reporting control unit 224 makes the reporting unit 214 report the notification information of the vehicle dispatch instruction received by the communication unit 212 from the vehicle dispatch management device 10, or report the detailed information of the order information. Moreover, for example, the reporting control unit 224 makes the reporting unit 214 report the report information that prompts the driver to select between accepting or rejecting the vehicle dispatch order. Moreover, for example, the reporting control unit 224 makes the reporting unit 214 report the vehicle mode setting information indicating that the vehicle mode is set by the vehicle mode setting unit 226. Furthermore, for example, the reporting control unit 224 makes the reporting unit 214 report the standby state setting information indicating that the standby state has been set by the standby state setting unit 227.

The vehicle location information obtaining unit 225 obtains the vehicle location information indicating the present location of the vehicle 200. In the embodiment, the vehicle location information obtaining unit 225 obtains the vehicle location information of the vehicle 200 based on the signals of the radio waves obtained by the GPS receiving unit 215. Then, the vehicle location information obtaining unit 225 outputs the vehicle location information to the communication control unit 222.

The vehicle mode setting unit 226 sets the vehicle mode to the empty mode, the occupied mode, the payment mode, the pickup mode, or the out-of-service mode. More specifically, when the operating unit 211 obtains an operation signal of a predetermined operation for setting the vehicle mode from the operation reception control unit 221, the vehicle mode setting unit 226 sets the vehicle mode. Then, the vehicle mode setting unit 226 outputs the set vehicle mode information to the display control unit 223, the reporting control unit 224, and the vehicle state information notifying unit 228.

The standby state setting unit 227 sets the state of the vehicle 200 to the standby state indicating that the vehicle 200 is on standby at the waiting place 300 such as a dispatch center or a taxi stand, or sets the state of the vehicle to a non-standby state. More specifically, when the operating unit 211 obtains an operation signal of a predetermined operation for setting the standby state from the operation reception control unit 221, the standby state setting unit 227 sets the standby state. For example, after joining at the end of the queue of the vehicles 200 at the waiting place 300, the driver of the concerned vehicle 200 performs a predetermined setting operation using the operating unit 211 and sets the state of the vehicle 200 to the standby state. Then, the standby state setting unit 227 outputs the standby state information to the display control unit 223, the reporting control unit 224, and the vehicle state information notifying unit 228.

The vehicle state information notifying unit 228 notifies the vehicle dispatch management device 10 about the vehicle state information containing the vehicle mode information and the standby state information. More specifically, the vehicle state information notifying unit 228 outputs, to the communication control unit 222, communication information to be used for notifying the vehicle state information containing the vehicle mode information obtained from the vehicle mode setting unit 226 and containing the standby state information obtained from the standby state setting unit 227.

Configuration of Monitoring Device

Figure 5:
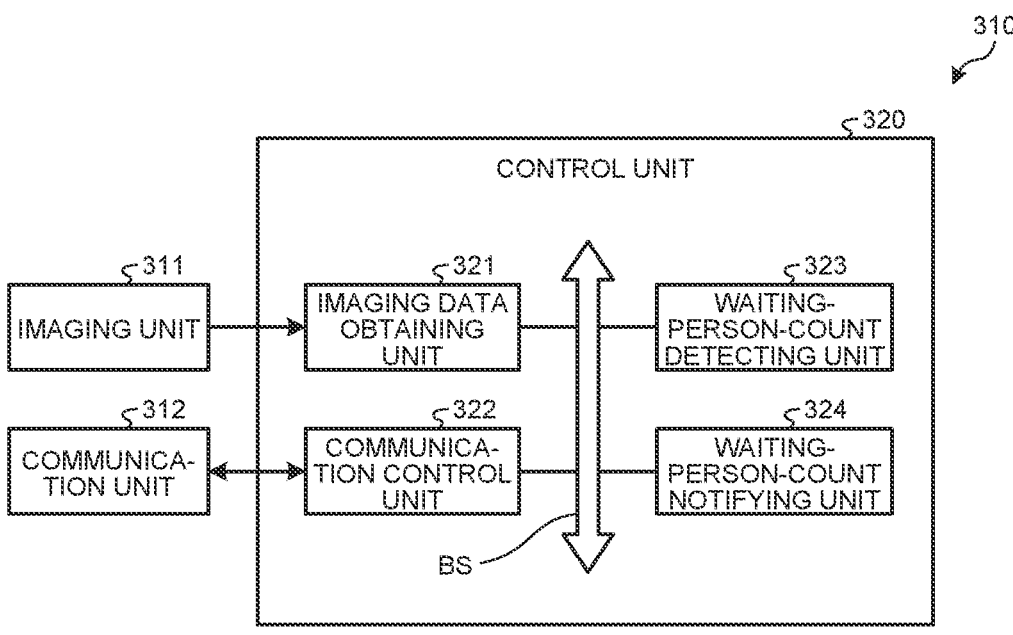
FIG. 5 is a block diagram illustrating an exemplary configuration of a monitoring device according to the embodiment.

Explained below with reference to FIG. 5 is a detailed configuration of the monitoring device 310. FIG. 5 is a block diagram illustrating an exemplary configuration of the monitoring device according to the embodiment. The monitoring device 310 includes the imaging unit 311, a communication unit 312, and a control unit 320.

The imaging unit 311 is a camera installed at the corresponding waiting place 300, and takes images of the persons queued up at the waiting place 300. The imaging unit 311 performs imaging to obtain such imaging data which at least enables detection of the number of persons waiting at the waiting place 300. Then, the imaging unit 311 outputs the imaging data to an imaging data obtaining unit 321 of the control unit 320.

The communication unit 312 is a unit for performing communication. The communication unit 312 performs communication with the vehicle dispatch management device 10. For example, the communication unit 312 sends, to the vehicle dispatch management device 10, the waiting person count information about the number of persons waiting at the corresponding waiting place 300. Meanwhile, the communication unit 312 performs a variety of communication based on the control signals output from a communication control unit 322 of the control unit 320.

The control unit 320 is, for example, an arithmetic processing device (a control device) configured with a CPU. The control unit 320 loads stored computer programs into a memory and executes the instructions written in the computer programs. The control unit 320 includes an internal memory (not illustrated). The internal memory is used to store computer programs written for implementing the constituent elements of the control unit 320. In that case, the control unit 320 loads the computer programs stored in the internal memory, and executes them so that the functions of the constituent elements are implemented. Meanwhile, the internal memory is also used to temporarily store the data of the control unit 320. The control unit 320 includes the following constituent elements connected to each other by the bus BS: the imaging data obtaining unit 321, the communication control unit 322, a waiting-person-count detecting unit 323, and a waiting-person-count notifying unit 324.

The imaging data obtaining unit 321 obtains, from the imaging unit 311, the imaging data obtained by imaging by the imaging unit 311. The imaging data obtaining unit 321 obtains the imaging data of the persons queued up at the waiting place 300. Then, the imaging data obtaining unit 321 outputs the imaging data to the waiting-person-count detecting unit 323.

The communication control unit 322 controls the communication performed by the communication unit 312. For example, the communication control unit 322 outputs the obtained communication information to the communication unit 312. For example, the communication control unit 322 obtains, from the waiting-person-count notifying unit 324, the waiting person count information about the number of persons queued up at the waiting place 300. Moreover, for example, the communication control unit 322 can also obtain, from the imaging data obtaining unit 321, the imaging data obtained as a result of performing imaging of the waiting place 300.

The waiting-person-count detecting unit 323 detects, from the imaging data, the number of persons queued up at the waiting place 300. Moreover, the waiting-person-count detecting unit 323 detects, from the imaging data, the faces of the persons queued up at the waiting place 300. The waiting-person-count notifying unit 324 can perform image detection using artificial intelligence (AI). Alternatively, the waiting-person-count detecting unit 323 can perform image processing for detecting faces of the persons from the imaging data. Examples of the image processing include binarization or filter processing. Then, the waiting-person-count detecting unit 323 outputs the detection data about the faces of the persons to the waiting-person-count notifying unit 324.

The waiting-person-count notifying unit 324 notifies the vehicle dispatch management device 10 about the number of persons queued up at the waiting place 300. More specifically, based on the detection data obtained from the waiting-person-count detecting unit 323, the waiting-person-count notifying unit 324 outputs, to the communication control unit 322, communication information to be used for notifying the waiting person count information about the persons who are waiting.

Figure 6:
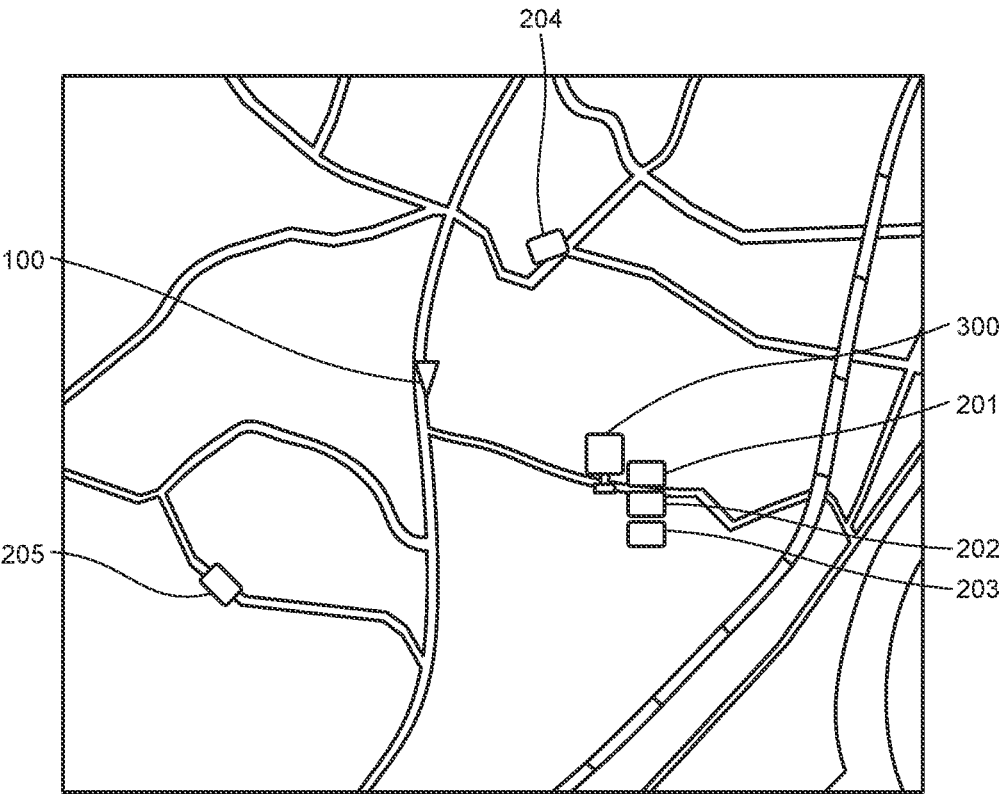
FIG. 6 is a schematic diagram illustrating an example of the positional relationship between a vehicle dispatch location, vehicles, and a waiting place.
Figure 7:
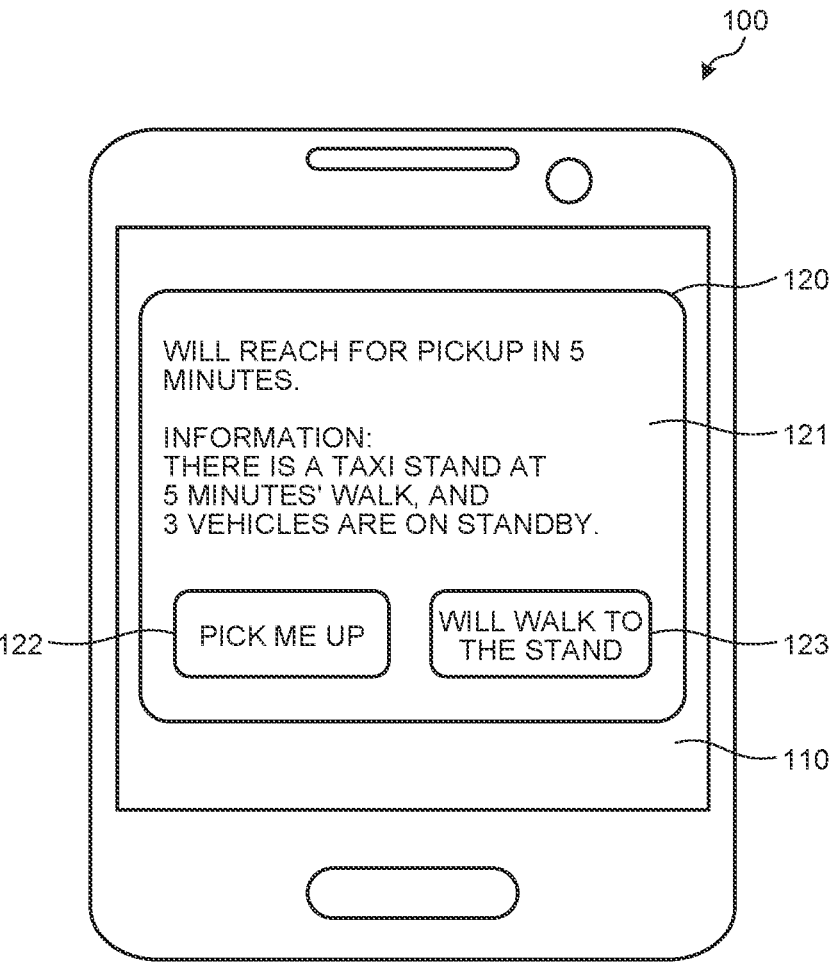
FIG. 7 is a schematic diagram illustrating an example of a client terminal according to the embodiment.

Example of Dispatch-Vehicle Waiting-Place Information Notified to Client Terminal Explained below with reference to FIGS. 6 and 7 is an example of the dispatch-vehicle waiting-place information that is notified to the client terminal 100. FIG. 6 is a schematic diagram illustrating an example of the positional relationship between the vehicle dispatch location, the vehicles, and the waiting place. FIG. 7 is a schematic diagram illustrating an example of the client terminal according to the embodiment.

In FIG. 6 is illustrated a map of the periphery of the client terminal 100. In the map of the periphery of the client terminal 100, the following is illustrated: the client terminal 100, the location information of a plurality of vehicles 200 matching with the set conditions of the order information; and the waiting place 300. The map information of the periphery of the client terminal 100 is obtained by the map information obtaining unit 32 from the map information storing unit 12 based on the location information of the vehicle dispatch location as obtained by the order information obtaining unit 31. The location information of the waiting place 300 is obtained by the waiting place information obtaining unit 33 from the waiting place information storing unit 13 based on the location information of the vehicle dispatch location as obtained by the order information obtaining unit 31.

In the example illustrated in FIGS. 6 and 7, the vehicle dispatch management device 10 notifies the client terminal 100 about: the waiting time till the dispatch of a vehicle, the required time to reach the nearby waiting place 300, and the standby vehicle count information indicating the number of vehicles 200 on standby at the waiting place 300. The waiting time till the dispatch of a vehicle represents the required time from the candidate vehicles to the client terminal 100. The required time to reach the nearby waiting place 300 represents the required time on foot from the client terminal 100 to the waiting place 300.

In the example illustrated in FIG. 6, the vehicles 201, 202, 203, 204, and 205 represent the candidate vehicles to which a vehicle dispatch instruction is notified. The candidate vehicles are retrieved by the candidate vehicle searching unit 41 from a plurality of vehicles 200 based on the order information obtained by the order information obtaining unit 31, based on the map information obtained by the map information obtaining unit 32, and based on the location information of the vehicles 200 as obtained by the vehicle information obtaining unit 34. Then, from among the vehicles 201, 202, 203, 204, and 205 representing the candidate vehicles, a single first-type candidate vehicle is selected. When the client terminal 100 notifies the vehicle dispatch management device 10 about a vehicle dispatch request, the first-type candidate vehicle is the candidate vehicle to which the vehicle dispatch management device 10 sends a vehicle dispatch instruction. The first-type candidate vehicle is selected by the first-type candidate vehicle selecting unit 42 from among a plurality of candidate vehicles retrieved by the candidate vehicle searching unit 41. The first-type candidate vehicle is selected based on the direct distance to the vehicle dispatch location, or the route to the vehicle dispatch location, or the required time to reach the vehicle dispatch location. For example, the first-type candidate vehicle is the closest vehicle to the vehicle dispatch location. In the embodiment, the vehicle 204 represents the first-type candidate vehicle.

The waiting time till the dispatch of a vehicle as notified by the vehicle dispatch management device 10 to the client terminal 100 represents the required time from the vehicle 204, which represents the first-type candidate vehicle, to the client terminal 100 as calculated by the required-time calculating unit 44. The required-time calculating unit 44 calculates the required time from the vehicle 204 to the client terminal 100 based on the order information obtained by the order information obtaining unit 31, based on the map information obtained by the map information obtaining unit 32, and based on the location information of the vehicles 200 as obtained by the vehicle information obtaining unit 34.

The required time to reach the nearby waiting place 300 as notified by the vehicle dispatch management device 10 to the client terminal 100 represents the required time on foot from the client terminal 100 to the waiting place 300 as calculated by the required-time calculating unit 44. The required-time calculating unit 44 calculates the required time on foot from the client terminal 100 to the waiting place 300 based on the order information obtained by the order information obtaining unit 31, based on the map information obtained by the map information obtaining unit 32, and based on the waiting place information obtained by the waiting place information obtaining unit 33.

The standby vehicle count information, which indicates the number of vehicles 200 waiting at the waiting place 300 as notified by the vehicle dispatch management device 10 to the client terminal 100, is obtained by the standby-vehicle-count information obtaining unit 43. Herein, the standby-vehicle-count information obtaining unit 43 can obtain the standby vehicle count information based on the waiting place information obtained by the waiting place information obtaining unit 33 and based on the standby state information of the vehicles 200 as obtained by the vehicle information obtaining unit 34. Alternatively, the standby-vehicle-count information obtaining unit 43 can obtain the standby vehicle count information based on the standby state information of the candidate vehicles that are retrieved by the candidate vehicle searching unit 41.

In the example illustrated in FIG. 7, the vehicle dispatch schedule information and the nearby-waiting-place information notified from the vehicle dispatch management device 10 is displayed in an application window 120 that is displayed in a display unit 110 of the client terminal 100. The application window 120 includes a character information display region 121, a vehicle dispatch request button 122, and a vehicle dispatch abort button 123. In the character information display region 121, the following information is displayed: the waiting time till the dispatch of a vehicle, the required time to reach the nearby waiting place 300, and the standby vehicle count information indicating the number of vehicles 200 on standby at the waiting place 300. Based on the information presented in the character information display region 121, the customer operating the client terminal 100 either selects and presses the vehicle dispatch request button 122 so as to request for the dispatch of a vehicle, or selects and presses the vehicle dispatch abort button 123 so as to walk to the waiting place 300 without requesting for the dispatch of a vehicle. When the pressing of the vehicle dispatch request button 122 is detected, the client terminal 100 sends, to the vehicle dispatch management device 10, response information indicating that a vehicle dispatch request is to be issued. Once the vehicle dispatch management device 10 receives, from the client terminal 100, the response information indicating that a vehicle dispatch request is to be issued, the vehicle dispatch order issued by the client terminal 100 gets finalized. As a result, the vehicle dispatch management device 10 issues a vehicle dispatch instruction to the first-type candidate vehicle. On the other hand, when the pressing of the vehicle dispatch abort button 123 is detected, the client terminal 100 sends, to the vehicle dispatch management device 10, response information indicating that a vehicle dispatch request is not to be issued. Once the vehicle dispatch management device 10 receives from the client terminal 100 the response information indicating that a vehicle dispatch request is not to be issued, the vehicle dispatch order issued by the client terminal 100 gets cancelled.

The vehicle dispatch management device 10 can notify the client terminal 100 also about the waiting person count information about the number of persons queued up at the waiting place 300. In the example illustrated in FIG. 7, the waiting person count information is displayed in the character information display region 121. Thus, the customer can compare the number of vehicles that are on standby with the number of persons who have queued up, and can get to know the congestion situation at the waiting place 300.

Operations Performed in Vehicle Dispatch Management Device

Figure 8:
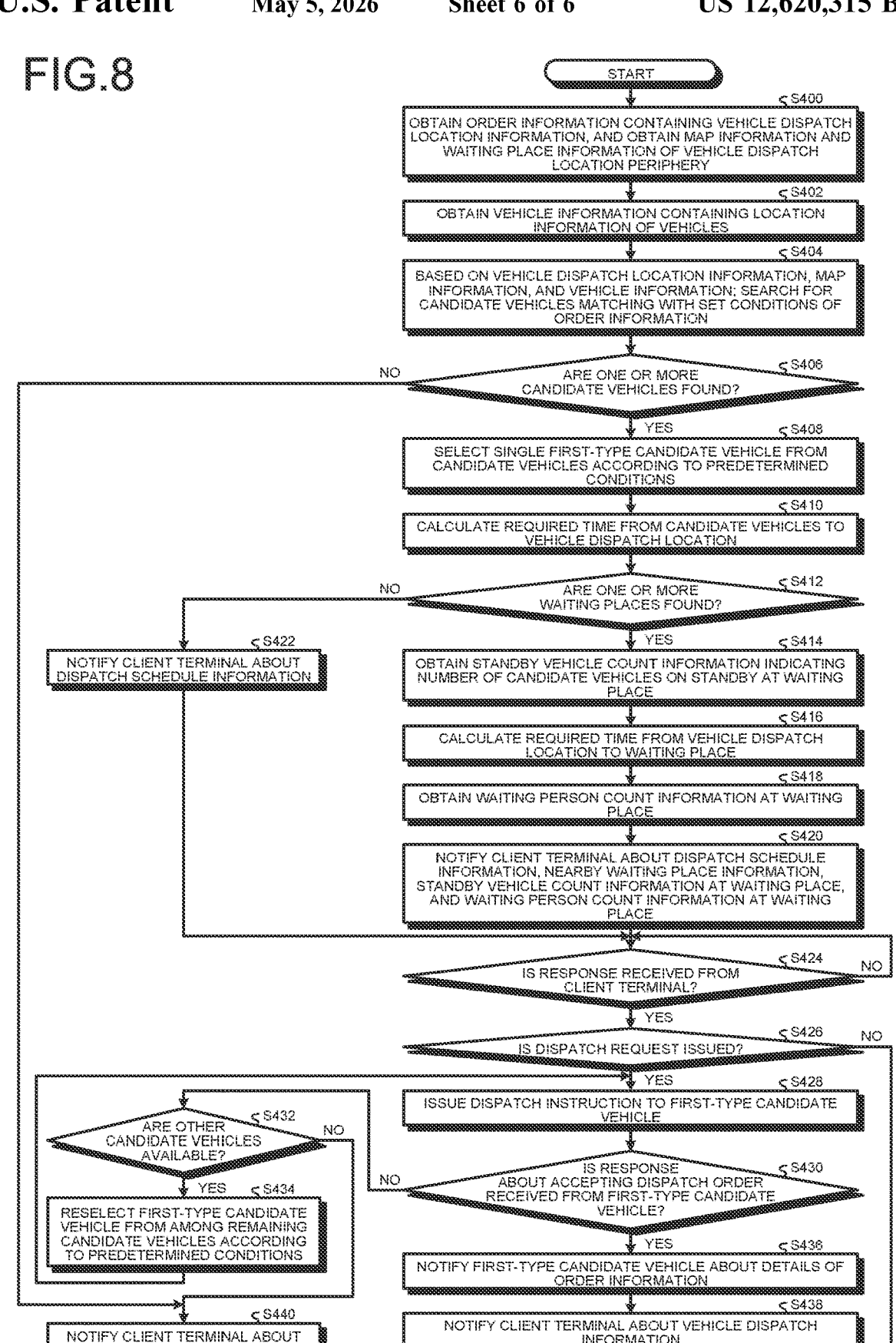
FIG. 8 is a flowchart for explaining an example of the operations performed in a vehicle dispatch management control device according to the embodiment.

Explained below with reference to FIG. 8 is the flow of operations performed in the vehicle dispatch management control device 20 of the vehicle dispatch management device 10. FIG. 8 is a flowchart for explaining an example of the operations performed in the vehicle dispatch management control device according to the embodiment. The operations illustrated in FIG. 8 are performed in the vehicle dispatch management control device 20 based on a predetermined control program and data. For example, when a vehicle dispatch request is received from the client terminal 100, the system control proceeds to Step S400 illustrated in FIG. 8, and the operations are started in the vehicle dispatch management control device 20. In the embodiment, the vehicle dispatch order includes the conditions set by the client terminal 100. The conditions include the predetermined range for searching the vehicles 200 for the candidate vehicles. In the embodiment, the conditions are set based on the set conditions that are set by the client using the client terminal 100.

The vehicle dispatch management control device 20 obtains the order information containing the vehicle dispatch location information, and obtains the map information and the waiting place information of the vehicle dispatch location periphery (Step S400). More particularly, the order information obtaining unit 31 obtains the order information of the vehicle dispatch order received by the communication unit 11 from the client terminal 100. The order information at least contains the location information of the vehicle dispatch location. In the embodiment, the vehicle dispatch location represents the location of the client terminal 100. Based on the location information of the vehicle dispatch location as obtained by the order information obtaining unit 31, the map information obtaining unit 32 obtains the map information of the vehicle dispatch location periphery from the map information storing unit 12. Moreover, based on the location information of the vehicle dispatch location as obtained by the order information obtaining unit 31, the waiting place information obtaining unit 33 obtains the location of the waiting place 300 in the vehicle dispatch location periphery from the waiting place information storing unit 13. Then, the system control proceeds to Step S402.

The vehicle dispatch management control device 20 obtains the vehicle information containing the location information of the vehicles 200 (Step S402). More particularly, the vehicle information obtaining unit 34 obtains, from the vehicle information storing unit 14, the vehicle information containing the location information of the vehicles 200 in the vehicle dispatch location periphery. Then, the system control proceeds to Step S404.

The vehicle dispatch management control device 20 searches for the candidate vehicles, which match with the set conditions of the order information, based on the vehicle dispatch location information, the map information, and the vehicle information (Step S404). More particularly, based on the order information obtained by the order information obtaining unit 31, based on the map information obtained by the map information obtaining unit 32, and based on the vehicle information of a plurality of vehicles 200 as obtained by the vehicle information obtaining unit 34; the candidate vehicle searching unit 41 searches the vehicles 200 for the candidate vehicles. In the example illustrated in FIG. 6, the vehicles 201, 202, 203, 204, and 205 represent the candidate vehicles. Then, the system control proceeds to Step S406.

The vehicle dispatch management control device 20 determines whether or not one or more candidate vehicles are found (Step S406). More particularly, the vehicle dispatch management control device 20 determines whether or not the candidate vehicle searching unit 41 has found, as the candidate vehicles from among the vehicles 200 present in the vehicle dispatch location periphery, the vehicles 200 matching with the set conditions of the order information. If one or more candidate vehicles are found (Yes at Step S406), then the system control proceeds to Step S408. However, if not even a single candidate vehicle is found (No at Step S406), then the system control proceeds to Step S440.

When one or more candidate vehicles are found (Yes at Step S406), the vehicle dispatch management control device 20 selects a single first-type candidate vehicle from the candidate vehicles according to predetermined conditions (Step S408). More particularly, based on the location information of the vehicle dispatch location as obtained by the order information obtaining unit 31 and based on the vehicle information obtained by the vehicle information obtaining unit 34, the first-type candidate vehicle selecting unit 42 selects a single first-type candidate vehicle from among the candidate vehicles retrieved by the candidate vehicle searching unit 41. The first-type candidate vehicle is, for example, the closest vehicle to the vehicle dispatch location. In the example illustrated in FIG. 6, the vehicle 204 represents the closest vehicle. Then, the system control proceeds to Step S410.

The vehicle dispatch management control device 20 calculates the required time from the candidate vehicles to the vehicle dispatch location (Step S410). More particularly, based on the order information obtained by the order information obtaining unit 31, based on the map information obtained by the map information obtaining unit 32, and based on the vehicle information of a plurality of vehicles 200 as obtained by the vehicle information obtaining unit 34; the required-time calculating unit 44 calculates the required time from the candidate vehicles, which are retrieved by the candidate vehicle searching unit 41, to the client terminal 100. In the example illustrated in FIG. 7, the required time from the candidate vehicles to the client terminal 100 is five minutes. Then, the system control proceeds to Step S412.

The vehicle dispatch management control device 20 determines whether or not one or more waiting places 300 are found (Step S412). More particularly, from among the waiting places 300 obtained by the waiting place information obtaining unit 33 from the waiting place information storing unit 13, the vehicle dispatch management control device 20 determines whether or not one or more waiting places 300 are present within a predetermined range from the client terminal 100. If one or more waiting places 300 are found (Yes at Step S412), then the system control proceeds to Step S414. On the other hand, if not even a single waiting place 300 is found (No at Step S412), then the system control proceeds to Step S422.

When one or more waiting places 300 are found (Yes at Step S412), the vehicle dispatch management control device 20 obtains the standby vehicle count information indicating the number of candidate vehicles on standby at the waiting place 300 (Step S414). More particularly, the standby-vehicle-count information obtaining unit 43 obtains the standby vehicle count information based on the waiting place information obtained by the waiting place information obtaining unit 33 and based on the standby state information of the vehicles 200 as obtained by the vehicle information obtaining unit 34. Then, the system control proceeds to Step S416.

The vehicle dispatch management control device 20 calculates the required time from the vehicle dispatch location to the waiting place 300 (Step S416). More particularly, based on the order information obtained by the order information obtaining unit 31, based on the map information obtained by the map information obtaining unit 32, and based on the waiting place information obtained by the waiting place information obtaining unit 33; the required-time calculating unit 44 calculates the required time on foot from the client terminal 100 to the waiting place 300. In the example illustrated in FIG. 7, the required time on foot from the client terminal 100 to the waiting place 300 is five minutes. Then, the system control proceeds to Step S418.

The vehicle dispatch management control device 20 obtains the waiting person count information at the waiting place 300 (Step S418). More particularly, the waiting-person-count information obtaining unit 35 obtains, from the waiting-person-count information storing unit 15, the waiting person count information indicating the number of persons queued up at the waiting place 300. Then, the system control proceeds to Step S420.

The vehicle dispatch management control device 20 notifies the client terminal 100 about the dispatch schedule information, the nearby waiting place information, the standby vehicle count information at the waiting place 300, and the waiting person count information at the waiting place 300 (Step S420). The dispatch schedule information contains the waiting time till the dispatch of a vehicle. The nearby waiting place information contains the location information of the nearby waiting place 300. Moreover, in the embodiment, the nearby waiting place information contains the required time to reach the nearby waiting place 300. More particularly, the dispatch-vehicle waiting-place information notifying unit 51 outputs, to the communication control unit 21, communication information to be used for notifying the dispatch schedule information, the nearby waiting place information, the standby vehicle count information at the waiting place 300, and the waiting person count information at the waiting place 300. As a result, the communication control unit 21 makes the communication unit 11 send, to the client terminal 100, the dispatch schedule information, the nearby waiting place information, the standby vehicle count information at the waiting place 300, and the waiting person count information at the waiting place 300. Then, the system control proceeds to Step S424.

Meanwhile, when not even a single waiting place 300 is found (No at Step S412), then the vehicle dispatch management control device 20 notifies the client terminal 100 about the dispatch schedule information (Step S422). More particularly, the dispatch-vehicle waiting-place information notifying unit 51 outputs, to the communication control unit 21, communication information to be used for notifying the dispatch schedule information. As a result, the communication control unit 21 makes the communication unit 11 send the dispatch schedule information to the client terminal 100. Then, the system control proceeds to Step S424.

The vehicle dispatch management control device 20 determines whether or not a response is received from the client terminal 100 (Step S424). More particularly, the vehicle dispatch management control device 20 determines whether or not the response obtaining unit 52 has obtained a response that indicates whether or not to issue a vehicle dispatch request and that is received by the communication unit 11 from the client terminal 100. If a response is received from the client terminal 100 (Yes at Step S424), then the system control proceeds to Step S426. On the other hand, if no response is received from the client terminal 100 (No at Step S424), then the vehicle dispatch management control device 20 repeatedly performs the operation at Step S424 until a response is received from the client terminal 100.

When a response is received from the client terminal 100 (Yes at Step S424), the vehicle dispatch management control device 20 determines whether or a not a vehicle dispatch request has been issued from the client terminal 100 (Step S426). More particularly, based on the response information obtained by the response obtaining unit 52, the vehicle dispatch management control device 20 determines whether or not the response of the client terminal 100 represents a vehicle dispatch request. When a vehicle dispatch request is issued from the client terminal 100 (Yes at Step S426), then the system control proceeds to Step S428. On the other hand, if a vehicle dispatch request is not issued from the client terminal 100 (No at Step S426), then it marks the end of the operations illustrated in the flowchart in FIG. 8.

When a vehicle dispatch request is issued from the client terminal 100 (Yes at Step S426), the vehicle dispatch management control device 20 issues a vehicle dispatch instruction to the first-type candidate vehicle for requesting to accept the vehicle dispatch order (Step S428). More particularly, the vehicle dispatch instruction notifying unit 61 outputs, to the communication control unit 21, communication information to be used for sending the vehicle dispatch instruction to the first-type candidate vehicle selected by the first-type candidate vehicle selecting unit 42. As a result, the communication control unit 21 makes the communication unit 11 send the vehicle dispatch instruction to the concerned vehicle 200 for requesting to accept the vehicle dispatch order. Then, the system control proceeds to Step S430.

The vehicle dispatch management control device 20 determines whether or not a response about accepting the vehicle dispatch order is received from the first-type candidate vehicle (Step S430). More particularly, based on the response information obtained by the order acceptance/nonacceptance obtaining unit 62, the vehicle dispatch management control device 20 determines whether the response from the first-type candidate vehicle indicates acceptance or nonacceptance of the vehicle dispatch order. If the response from the first-type candidate vehicle indicates acceptance of the vehicle dispatch order (Yes at Step S430), then the system control proceeds to Step S436. On the other hand, if the response from the first-type candidate vehicle indicates nonacceptance of the vehicle dispatch order (No at Step S430), then the system control proceeds to Step S432.

When the response from the first-type candidate vehicle indicates nonacceptance of the vehicle dispatch order (No at Step S430), the vehicle dispatch management control device 20 determines whether or not another candidate vehicle is available (Step S432). More particularly, the vehicle dispatch management control device 20 determines whether or not, from among the candidate vehicles retrieved by the candidate vehicle searching unit 41, one or more candidate vehicles other than the first-type candidate vehicle are available. If other candidate vehicles are available (Yes at Step S432), then the system control proceeds to Step S434. On the other hand, if no other candidate vehicle is available (No at Step S432), then the system control proceeds to Step S440.

When other candidate vehicles are available (Yes at Step S432), the vehicle dispatch management control device 20 again selects a single first-type candidate vehicle from among the remaining candidate vehicles according to a predetermined condition (Step S434). More particularly, while excluding the earlier first-type candidate vehicle, the first-type candidate vehicle selecting unit 42 again selects a single first-type candidate vehicle from among the candidate vehicles retrieved by the candidate vehicle searching unit 41. Then, the system control returns to Step S428.

Meanwhile, when the response from the first-type candidate vehicle indicates acceptance of the vehicle dispatch order (Yes at Step S430), the vehicle dispatch management control device 20 notifies the dispatch vehicle about the details of the order information (Step S436). More particu-
larly, when the order acceptance/nonacceptance obtaining
unit 62 obtains a response indicating acceptance of the
vehicle dispatch order from the first-type candidate vehicle,
the order information notifying unit 71 sets the first-type
vehicle as the dispatch vehicle and outputs, to the commu-
nication control unit 21, about communication information
to be used for notifying the dispatch vehicle about the details
of the order information. The details of the order information
can include, for example, the name of the person who issued
the vehicle dispatch order. As a result, the communication
control unit 21 makes the communication unit 11 send the
details of the order information to the concerned vehicle
200. Then, the system control proceeds to Step S438.

The vehicle dispatch management control device 20 noti-
fies the client terminal 100 about the vehicle dispatch
information (Step S438). More particularly, when the order
acceptance/nonacceptance obtaining unit 62 obtains the
response indicating acceptance of the vehicle dispatch order
from the first-type candidate vehicle, the vehicle dispatch
information notifying unit 72 sets the first-type candidate
vehicle as the dispatch vehicle and outputs, to the commu-
nication control unit 21, the notification information to be
used for notifying the client terminal 100 about the vehicle
dispatch information indicating the information about the
vehicle 200 to be dispatched. As a result, the communication
control unit 21 makes the communication unit 11 send the
vehicle dispatch information, which contains the informa-
tion about the vehicle 200 to be dispatched, to the concerned
vehicle 200. It marks the end of the operations illustrated in
the flowchart in FIG. 8.

Meanwhile, when not even a single candidate vehicle is
found (No at Step S406) or when no other candidate vehicle
is available (No at Step S432), the vehicle dispatch man-
agement control device 20 notifies the client terminal 100
about the order nonacceptance information (Step S440).
More particularly, the vehicle dispatch information notifying
unit 72 outputs, to the communication control unit 21,
communication information to be used for notifying the
order nonacceptance information indicating that a vehicle
cannot be dispatched under the set conditions. As a result,
the communication control unit 21 makes the communica-
tion unit 11 send the order nonacceptance information to the
client terminal 100. It marks the end of the operations
illustrated in the flowchart in FIG. 8.

As explained above, the vehicle dispatch management
system 1 according to the embodiment notifies the client
terminal 100, which issued a vehicle dispatch order, about
the dispatch schedule information containing the required
time, and about the waiting placing information containing
the location information of the waiting place 300. As a
result, the customer becomes able to either select issuing a
vehicle dispatch order for requesting a pickup by paying the
pickup charge, or select walking to the waiting place 300 to
save some money.

Meanwhile, the waiting-person-count detecting unit 323
can be installed in the vehicle dispatch management control
device 20 of the vehicle dispatch management device 10. In
that case, the imaging unit 311 sends the image data to the
vehicle dispatch management device 10. Moreover, the
method by which the monitoring device 310 obtains the
number of persons queued up at the waiting place 300 is not
limited to the method according to the embodiment, and
alternatively the number of waiting persons can be obtained
using some other type of sensor.

In the embodiment, when a response indicating nonac-
ceptance of the vehicle dispatch order is received from the first-type candidate vehicle, the vehicle dispatch manage-
ment control device 20 again selects a single first-type
candidate vehicle from among the remaining candidate
vehicles (Step S434). However, alternatively, the candidate
vehicles can be again searched afresh. The vehicle dispatch
management control device 20 can repeatedly perform the
search at predetermined intervals.

Meanwhile, the constituent elements of the vehicle dis-
patch management device 10, the in-vehicle device 210, and
the vehicle dispatch management system 1 as illustrated in
the drawings are merely conceptual, and need not be physi-
cally configured as illustrated. The constituent elements, as
a whole or in part, can be separated or integrated either
functionally or physically based on various types of loads or
use conditions.

Moreover, the configuration of the vehicle dispatch man-
agement device 10 and the in-vehicle device 210 is imple-
mented using computer programs loaded in a memory. In the
embodiment described above, the configuration is explained
as functional blocks implemented as a result of coordination
between hardware and software. That is, the functional
blocks can be implemented in various forms such as using
only hardware, or using only software, or using a combina-
tion of hardware and software.

Although the disclosure has been described with respect
to specific embodiments for a complete and clear disclosure,
the appended claims are not to be thus limited but are to be
construed as embodying all modifications and alternative
constructions that may occur to one skilled in the art that
fairly fall within the basic teaching herein set forth.

What is claimed is:
1. A vehicle dispatch management control system com-
prising:
a client terminal that issues a vehicle dispatch order to a
vehicle dispatch management control device;
the vehicle dispatch management control device that
provides a central processing unit and stores map
information therein, comprising:
a vehicle information obtaining unit that obtains
vehicle information containing location information
of a plurality of vehicles;
an order information obtaining unit that obtains order
information containing location information of the
client terminal which issued the vehicle dispatch
order;
a candidate vehicle searching unit that, based on the
vehicle information, searches the plurality of
vehicles for a candidate vehicle which matches with
condition specified in the order information;
a waiting place information obtaining unit that obtains
waiting place information containing location infor-
mation of a plurality of waiting places at which
vehicles remain on standby and determines whether
or not there is one or more nearby waiting places,
which are within a predetermined range from the
client terminal among the plurality of waiting places;
a required-time calculating unit that calculates dispatch
schedule information containing required time from
the candidate vehicle to the client terminal, nearby
waiting place information containing location infor-
mation of the waiting places, and a required time on
foot from the client terminal to the nearby waiting
places;
a standby vehicle count obtaining unit that obtains
standby vehicle count information indicating a num-
ber of candidate vehicles on standby at the nearby
waiting places;

a waiting-person-count information obtaining unit that obtains waiting person count information indicating a number of persons queued up at the nearby waiting places;

a dispatch-vehicle waiting-place information notifying unit that notifies the dispatch schedule information to the client terminal;

a vehicle dispatch information notifying unit that notifies the vehicle information of the candidate vehicle to the client terminal;

a response obtaining unit that obtains response information indicating whether or not a vehicle dispatch request is issued from the client terminal; and a vehicle dispatch instruction notifying unit that notifies the candidate vehicle about a vehicle dispatch instruction for requesting to accept the vehicle dispatch order when the response information indicates that the vehicle dispatch request is issued, wherein the dispatch-vehicle waiting-place information notifying unit further notifies, if the one or more nearby waiting places is present, the client terminal about the nearby waiting place information, the standby vehicle count information, and the waiting person count information, and wherein the client terminal further comprises:

a receiving unit that receives the dispatch schedule information, the nearby waiting place information, the standby vehicle count information, and the waiting person count information from the vehicle dispatch management control device; and a display unit that displays:

a map that is included in the map information and which includes the location of the client terminal, the candidate vehicle, and the nearby waiting places; and the required time from the candidate vehicle to the client terminal, the required time on foot from the client terminal to the nearby waiting places, the standby vehicle count information, the waiting person count information, a vehicle dispatch request button that indicates a request for the dispatch of a vehicle, and a vehicle dispatch abort button that indicates walk to the nearby waiting place without requesting for the dispatch of a vehicle; and a notification unit that notifies, to the vehicle dispatch management control device, the response information based on a customer's selection of the vehicle dispatch request button or the vehicle dispatch abort button.

2. The vehicle dispatch management control system according to claim 1, wherein the dispatch-vehicle waiting-place information notifying unit notifies the client terminal about the waiting person count information of the waiting places.

3. A vehicle dispatch management device comprising:

the vehicle dispatch management control device according to claim 1; and a communication unit that performs communication with a plurality of client terminals that issues a vehicle dispatch order, the plurality of vehicles, and the plurality of waiting places.

4. A vehicle dispatch management system comprising:

the vehicle dispatch management device according to claim 3;

the plurality of client terminals, comprising the client terminal according to claim 1;

the plurality of vehicles having an in-vehicle device installed therein; and the plurality of waiting places having a monitoring device installed therein.

5. The vehicle dispatch management system according to claim 4, wherein the in-vehicle device includes a communication unit that performs communication with the vehicle dispatch management device, a reporting unit that reports a vehicle dispatch instruction issued from the vehicle dispatch management device, an operating unit that selects acceptance/nonacceptance of the vehicle dispatch instruction, and a display unit that displays the order information.

6. The vehicle dispatch management system according to claim 4, wherein the in-vehicle device includes a standby state notifying unit that notifies the vehicle dispatch management device about a standby state at corresponding waiting place.

7. The vehicle dispatch management system according to claim 4, wherein the monitoring device includes a communication unit that communicates with the vehicle dispatch management device, and an imaging unit that performs imaging of corresponding waiting place.

8. The vehicle dispatch management system according to claim 7, wherein the monitoring device includes a waiting-person-count detecting unit that, based on image data obtained by imaging by the imaging unit, detects number of persons queued up at corresponding waiting place.

9. A vehicle dispatch management method comprising:

receiving, by a system comprising at least one processor, a vehicle dispatch order from a client terminal;

obtaining, by the system, vehicle information containing location information of a plurality of vehicles, wherein map information relating to locations of the plurality of vehicles is stored;

obtaining, by the system, order information containing location information of the client terminal which issued the vehicle dispatch order;

searching, by the system, that, based on the vehicle information, includes searching the plurality of vehicles for a candidate vehicle which matches with condition specified in the order information;

obtaining, by the system, waiting place information containing location information of a plurality of waiting places at which vehicles remain on standby;

determining, by the system, whether or not there is one or more nearby waiting places, which are within a predetermined range from the client terminal among the plurality of waiting places;

calculating, by the system, dispatch schedule information comprising required time from the candidate vehicle to the client terminal, location information of the waiting places, and a required time on foot from the client terminal to the nearby waiting places;

obtaining, by the system, standby vehicle count information indicating a number of candidate vehicles on standby at the nearby waiting places;

obtaining, by the system, waiting person count information indicating a number of persons queued up at the nearby waiting places;

notifying, by a vehicle dispatch management control device of the system, the dispatch schedule information to the client terminal;

notifying, by the vehicle dispatch management control device of the system, the vehicle information of the candidate vehicle to the client terminal;

obtaining, by the vehicle dispatch management control device of the system, response information indicating whether or not a vehicle dispatch request is issued from the client terminal; and notifying, by the system, the candidate vehicle about a vehicle dispatch instruction for requesting to accept the vehicle dispatch order when the response information indicates that the vehicle dispatch request is issued, wherein the notifying to the client terminal further notifies, if the one or more nearby waiting places is present, the client terminal about the nearby waiting place information, the standby vehicle count information, and the waiting person count information;

receiving, by the client terminal of the system, the dispatch schedule information, the nearby waiting place information, the standby vehicle count information, and the waiting person count information from the vehicle dispatch management control device;

displaying, by a display of the client terminal, a map that is included in the map information, the required time from the candidate vehicle to the client terminal, the required time on foot from the client terminal to the nearby waiting places, the standby vehicle count information, the waiting person count information, a vehicle dispatch request button that indicates a request for the dispatch of a vehicle, and a vehicle dispatch abort button that indicates walk to the nearby waiting place without requesting for the dispatch of a vehicle, wherein the map comprises the location of the client terminal, the candidate vehicle, and the nearby waiting places; and notifying, by the client terminal, to the vehicle dispatch management control device, the response information based on a customer's selection of the vehicle dispatch request button or the vehicle dispatch abort button.

10. The vehicle dispatch management method according to claim 9, wherein the notifying notifies the client terminal about the waiting person count information of the waiting places.

11. The vehicle dispatch management method according to claim 9, further comprising performing communication with a plurality of client terminals that issues a vehicle dispatch order, the plurality of vehicles, and the plurality of waiting places.

12. A non-transitory computer readable recording medium storing therein a computer program product having a computer readable medium including programmed instructions, wherein the instructions, when executed by a computer functioning as a vehicle dispatch management control device, cause the computer to perform:

receiving a vehicle dispatch order from a client terminal;

obtaining vehicle information containing location information of a plurality of vehicles, wherein map information relating to locations of the plurality of vehicles is stored;

obtaining order information containing location information of the client terminal which issued the vehicle dispatch order;

searching that, based on the vehicle information, includes searching the plurality of vehicles for a candidate vehicle which matches with condition specified in the order information;

obtaining waiting place information containing location information of a plurality of waiting places at which vehicles remain on standby;

determining whether or not there is one or more nearby waiting places, which are within a predetermined range from the client terminal among the plurality of waiting places;

calculating dispatch schedule information comprising required time from the candidate vehicle to the client terminal, location information of the waiting places, and a required time on foot from the client terminal to the nearby waiting places;

obtaining standby vehicle count information indicating a number of candidate vehicles on standby at the nearby waiting places;

obtaining waiting person count information indicating a number of persons queued up at the nearby waiting places;

notifying the dispatch schedule information to the client terminal;

notifying the vehicle information of the candidate vehicle to the client terminal;

obtaining response information indicating whether or not a vehicle dispatch request is issued from the client terminal;

notifying the candidate vehicle about a vehicle dispatch instruction for requesting to accept the vehicle dispatch order when the response information indicates that the vehicle dispatch request is issued, wherein the notifying to the client terminal further notifies, if the one or more nearby waiting places is present, the client terminal about the nearby waiting place information, the standby vehicle count information, and the waiting person count information; and communicating the dispatch schedule information, the nearby waiting place information, the standby vehicle count information, and the waiting person count information to the client terminal, wherein a display of the client terminal displays a map that is included in the map information, the required time from the candidate vehicle to the client terminal, the required time on foot from the client terminal to the nearby waiting places, the standby vehicle count information, the waiting person count information, a vehicle dispatch request button that indicates a request for the dispatch of a vehicle, and a vehicle dispatch abort button that indicates walk to the nearby waiting place without requesting for the dispatch of a vehicle, wherein the map comprises the location of the client terminal, the candidate vehicle, and the nearby waiting places, and wherein the client terminal notifies, to the vehicle dispatch management control device, the response information based on a customer's selection of the vehicle dispatch request button or the vehicle dispatch abort button.

13. The non-transitory computer readable recording medium according to claim 12, wherein the notifying notifies the client terminal about the waiting person count information of the waiting places.

14. The non-transitory computer readable recording medium according to claim 12, further comprising performing communication with a plurality of client terminals that issues a vehicle dispatch order, the plurality of vehicles, and the plurality of waiting places.

* * * * *